Patented Dec. 12, 1933

1,939,403

UNITED STATES PATENT OFFICE 1,939,403

MISCIBLE SULPHUR

Adriaan Nagelvoort, Wilmington, Del., assignor to Delaware Chemical Engineering Company, Wilmington, Del., a corporation of Delaware No Drawing. Application May 2, 1932
Serial No. 608,866

6 Claims. (Cl. 252—6)

This invention relates to miscible sulphur; and it comprises as a new preparation freely wetted by water and readily miscible therewith to make pastes and suspensions, a physical mixture of fine dry ordinary sulphur with a modicum of a fine dry emulsifying agent, this agent being often dried solids of sulphite waste liquor, although sometimes other dry vegetable extracts having tanning properties, including tannin itself, are used; and it also comprises a method of making the said miscible preparation wherein fine sulphur is mixed with a modicum of an emulsifying agent having tanning properties, such as sulphite waste liquor or tannin, mixing being usually accomplished by wet grinding sulphur with the said emulsifying agent, the said mixture being thereafter advantageously washed to remove substantially all of the said emulsifying agent; all as more fully hereinafter set forth and as claimed.

Ordinary fine sulphur, either as flowers of sulphur or fine ground lump sulphur, is not wetted by ordinary water. To cause wetting, there is ordinarily used a volatile solvent or an alkaline material dissolved in the water; both being inconvenient. Sulphur wetted with ordinary water is wanted in many relations; as in making fungicidal suspensions, sprays, and the like. It is often desirable to incorporate rather large amounts of sulphur in wet pulp in making paper or cardboard for one purpose or another, while paper containing a little sulphur is sometimes wanted for wrapping fruit and articles susceptible of mildew. Impregnation with sulphur sufficient to fill or coat pores is wanted in making waterproof hard paper and pulp articles. A desirable way of doing this is to incorporate sulphur in paper pulp, make the dry article and melt the sulphur in place.

Impregnation of paper and cards with melted sulphur is impracticable in making articles of satisfactory character; and particularly where only a little sulphur is wanted. In making waterproof cartons, they are sometimes dipped in melted sulphur. This is only satisfactory where a mere surface impregnation is wanted. Attempts have been made to impregnate paper with sulphur dissolved in a volatile solvent, such as carbon bisulphid; but, while satisfactory results can be attained, so far as partial impregnation is concerned, the manufacture is extremely dangerous.

I have found that by making a physical mixture of flowers of sulphur or fine ground sulphur, with a minimal amount of various peptizing agents, notably tannin, a sulphur preparation can be made which is wet with water as freely as any other insoluble material. Sulphur preparations so made can be stirred up into water to make such suspensions or pastes as may be wanted. With these miscible sulphur preparations, sulphur can be incorporated with wet cellulose pulp in the manufacture of paper; being simply added to the pulp and stirred. Pulp board or paper can, for example, be made by suspending sulphur in the water used for paper or pulp board making and otherwise proceeding exactly as usual. After the paper or board is manufactured and dried, the sulphur can then be fused in place. It is a convenient operation to incorporate sulphur in wet pulp, make dry pulp board and then hot stamp to make finished articles. The sulphur melts in stamping and sets in cooling. In this way, it is possible to make articles of waterproof nature, non-absorbent of moisture, of high insulating value and proof against mildew, bacterial action, etc.

An expedient sometimes used is to incorporate peptized sulphur with pulp, make wet sheet or board and wash with water to remove the peptizing agent. Upon drying the sheet, the sulphur is restored to its normal water-repellent condition. A rather small amount of sulphur so incorporated in paper or card makes it quite resistant to wetting with water, while not necessarily disturbing porosity.

The amount of dispersing agent used in the present invention with production of satisfactory results may be extraordinarily little. For most purposes and with most grades of fine sulphur an intimate physical admixture of as little as one pound of dry commercial tannin with a ton of fine ground sulphur gives a product readily wet by water. With other materials on the market for tanning purposes somewhat more is required; but in all cases the amount of dispersing agent is minute; there is not enough to prevent the sulphur ranking as pure.

One of the cheap and available materials for my purposes is sulphite waste liquor. Various commercial preparations made from weak sulphite liquor are on the market and these can be used. One dry preparation is made by neutralizing sulphite waste liquor, evaporating to dryness and fine grinding. About 4 pounds of this preparation intimately mixed with one ton of fine sulphur gives a good preparation for my purposes. Another commercial preparation on the market is a 30° Bé. solution containing about 50 per cent solids. These sulphite liquor preparations have tanning properties and are often used in making leather. Something less than a gallon of the liquid material is used with a ton of sulphur. This preparation can be diluted with water and stirred into the solution; the mixture being afterward dried if desired.

The mixing process can be abbreviated, in any event, by wet mixing. One way of effecting a mixture is to take a pound of tannic acid, 4 pounds of dry sulphite waste liquor or 8 pounds of a sulphite waste liquor containing 50 per cent solids, add 0.75 ton of water and a ton of sulphur and run the mixture through some sort of milling device to form a sulphur pulp. This sulphur pulp contains from 0.05 to 0.2 per cent of the emulsifying agent, based on the sulphur present. The sulphur can then be allowed to settle out. It may be washed while wet and will still retain its miscibility with water. With the dispersing agent washed out, the wet pulp of sulphur and water is still miscible with water and with wet paper pulp.

It is not necessary to employ a so-called "colloid mill" for grinding the sulphur of my invention, in fact a superior product is obtained when the fineness is such that the sulphur will settle out on standing. Fine sulphur ground in this manner has particles varying in size.

Wet grinding with a peptizing agent is often desirable with commercial sulphur. Much of the commercial pulverulent sulphur is fine ground, crushed material; and it does not have the particle fineness of "flowers of sulphur" made by sublimation processes. The present method may be utilized in making sulphur of colloidal fineness from commercial pulverulent sulphur; the latter being wet ground in the presence of a peptizing agent and this then removed, if it be desired. In making sulphur suspensions under the present invention, in any event, it is desirable to wet grind with relatively coarse commercial sulphurs.

What I claim is:

1. A fine, dry sulphur preparation freely miscible with water in all proportions consisting of finely ground sulphur containing from about 0.05 to 0.2 per cent of a tanning agent, selected from a class consisting of tannin and a sulphite waste liquor preparation, and having a fineness such that the sulphur will readily settle out from an aqueous dispersion upon standing.

2. The preparation of claim 1 wherein the tanning agent is tannic acid.

3. The preparation of claim 1 in admixture with water.

4. A fine, dry sulphur preparation freely miscible with water in all proportions consisting of finely ground sulphur containing approximately 0.05 per cent of tannin and having a fineness such that the sulphur will readily settle out from an aqueous dispersion upon standing.

5. In the manufacture of miscible sulphur, the process which comprises wet grinding fine sulphur mixed with about 0.05 to 0.2 per cent of a tanning agent, selected from a class consisting of tannin and a sulphite waste liquor preparation, until it reaches a fineness such that the sulphur will just readily settle out from an aqueous dispersion upon standing.

6. In the manufacture of miscible sulphur, the process which comprises wet grinding fine sulphur mixed with approximately 0.05 per cent of tannin, washing the resulting mixture to remove the tannin, leaving substantially pure sulphur in moist condition, freely miscible with water and having a fineness such that the sulphur will readily settle out from an aqueous dispersion upon standing.

ADRIAAN NAGELVOORT.